(12) United States Patent
Sakai et al.

(10) Patent No.: US 6,427,535 B1
(45) Date of Patent: Aug. 6, 2002

(54) WEATHER FORECASTING SYSTEM

(75) Inventors: Yokio Sakai, 7-12, Higashiaramachi, 3-chome, Nagaoka-shi, Niigata-ken 940-0022; Isao Matsuki, Kokubunji; Katsuhiro Nagaya, Mitaka; Hideki Oguchi, Chofu; Hitoshi Godai, Mitaka, all of (JP)

(73) Assignee: Yokio Sakai, Nagaoka (JP)

( * ) Notice: Subject to any disclaimer, the term of this patent is extended or adjusted under 35 U.S.C. 154(b) by 118 days.

(21) Appl. No.: 09/718,491

(22) Filed: Nov. 24, 2000

(30) Foreign Application Priority Data

Nov. 25, 1999 (JP) .......................................... 11-333929
Nov. 25, 1999 (JP) .......................................... 11-333933

(51) Int. Cl.$^7$ ............................................... G01W 1/10
(52) U.S. Cl. ...................... 73/587; 73/602; 73/170.28; 73/170.16
(58) Field of Search ........................ 73/579, 587, 594, 73/597, 600, 602, 170.16, 170.17, 170.28

(56) References Cited

U.S. PATENT DOCUMENTS

| | | | |
|---|---|---|---|
| 4,580,814 A | * 4/1986 | Berler | 235/89 R |
| 5,509,304 A | * 4/1996 | Peterman et al. | 367/90 |
| 5,796,611 A | * 8/1998 | Ochiai et al. | 340/601 |
| 5,999,121 A | * 12/1999 | Salonen | 324/640 |
| 6,164,130 A | * 12/2000 | Pabst et al. | 73/170.24 |

FOREIGN PATENT DOCUMENTS

JP 2001-153967 A * 8/2001 ............ G01W/1/10

OTHER PUBLICATIONS

Yokio Sakai et al., "Practical Forecast of the Maximal Snow Depth Considering . . . ," Journal of Hydraulic, Coastal and Environmental Engineering, Japan Society of Civil Engineers, No. 551, II–37 (Nov. 1996).

Yokio Sakai et al., "A Possibility of Forecast on Maximum Snow Depth based on Mantis's Egg Sack," Journal of Snow Engineering of Japan, Japan Society of Snow Engineering, vol. 10, No. 1 Ser. No. 30 (Jan 1994).

* cited by examiner

*Primary Examiner*—Hezron Williams
*Assistant Examiner*—Rose M. Miller
(74) *Attorney, Agent, or Firm*—Paul A. Guss

(57) ABSTRACT

A weather forecasting apparatus, which is capable of accurately forecasting local atmospheric phenomena, has a vibration sensor attached to a tree for measuring an arboreal sound propagated through the tree. A voltage outputted from the vibration sensor depending on the measured arboreal sound is sent via an arboreal sound observing device to a data processing device. The data processing device includes a forecasting processor which determines the start or end of a rainfall based on the magnitude of the voltage, i.e., a sound pressure level corresponding to the magnitude of the sound pressure of the arboreal sound. When the sound pressure level rises, the forecasting processor determines the end of a rainfall, and when the sound pressure level drops, the forecasting processor determines the start of a rainfall. There is also disclosed a snowfall forecasting apparatus capable of accurately forecasting a local snowfall.

13 Claims, 16 Drawing Sheets

WEATHER FORECASTING SYSTEM

BACKGROUND OF THE INVENTION

1. Field of the Invention

The present invention relates to a weather forecasting system for forecasting atmospheric phenomena such as the weather, a snowfall, etc. based on arboreal sounds.

2. Description of the Related Art

Heretofore, it has been customary to predict changes in atmospheric phenomena such as atmospheric states and various atmospheric conditions including rain, wind, thunder, etc. by analyzing a weather map or analyzing the movement of a rainy region obtained by a weather radar.

However, the above predictive methods make it difficult to predict atmospheric phenomena in a local region.

It has been the conventional practice to predict a snowfall by determining an approximate predicted amount based on a long-term prediction of atmospheric phenomena.

However, there has not been established a process of accurately predicting a snowfall in a local region.

SUMMARY OF THE INVENTION

It is therefore an object of the present invention to provide an apparatus for and a method of forecasting atmospheric phenomena in a local region and obtaining accurate forecast results.

Another object of the present invention is to provide an apparatus for and a method of forecasting a snowfall in a local region and obtaining accurate forecast results.

Still another object of the present invention is to provide a weather forecasting system which is capable of forecasting atmospheric phenomena in a wide geographical region and obtaining accurate forecast results.

According to an aspect of the present invention, there is provided an apparatus for forecasting the weather, comprising arboreal sound measuring means for measuring a sound propagated through a tree, and weather forecasting means for forecasting atmospheric phenomena based on a change in the sound measured by the arboreal sound measuring means.

The change in the sound comprises a time-dependent change in a sound pressure of the sound.

The weather forecasting means comprises means for predicting the start of a rainfall if a drop of the sound pressure is confirmed, and predicting the end of a rainfall if a rise of the sound pressure is confirmed.

The apparatus for forecasting the weather is relatively simple in arrangement, and is capable of forecasting atmospheric phenomena in a local region and obtaining accurate forecast results.

According to another aspect of the present invention, there is also provided a method of predicting the weather, comprising the steps of measuring a sound propagated through a tree, and forecasting atmospheric phenomena based on a change in the measured sound.

The above method is of forecasting atmospheric phenomena in a local region and obtaining accurate forecast results.

According to still another aspect of the present invention, an apparatus for forecasting a snowfall comprises arboreal sound measuring means for measuring a sound propagated through a tree along the height of the tree, and snowfall forecasting means for forecasting a snowfall based on a change along the height of the tree in the sound measured by the arboreal sound measuring means.

In the above apparatus, the change along the height of the tree in the sound comprises a change in a sound pressure of the sound along the height of the tree.

The snowfall forecasting means comprises means for forecasting a position where a positive peak of the sound pressure along the height of the tree occurs as a predicted maximum snowfall.

The apparatus for forecasting a snowfall is relatively simple in arrangement, and is capable of forecasting a snowfall in a local region and obtaining accurate forecast results.

According to yet another aspect of the present invention, a method of forecasting a snowfall comprises the steps of measuring a sound propagated through a tree along the height of the tree, and forecasting a snowfall based on a change along the height of the tree in the measured sound.

In the above method of forecasting a snowfall, the change along the height of the tree in the sound comprises a change in a sound pressure of the sound along the height of the tree, and the step of forecasting a snowfall comprises the step of forecasting a position where a positive peak of the sound pressure along the height of the tree occurs as a predicted maximum snowfall.

The method of forecasting a snowfall is capable of forecasting a snowfall in a local region and obtaining accurate forecast results.

According to yet still another aspect of the present invention, there is provided a weather forecasting system comprising arboreal sound measuring means for measuring a sound propagated through a tree, a plurality of weather forecasting apparatus for forecasting atmospheric phenomena based on a change in the sound measured by the arboreal sound measuring means, and a data collecting and processing device connected to the weather forecasting apparatus by a network, for forecasting atmospheric phenomena in a wide geographical region.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
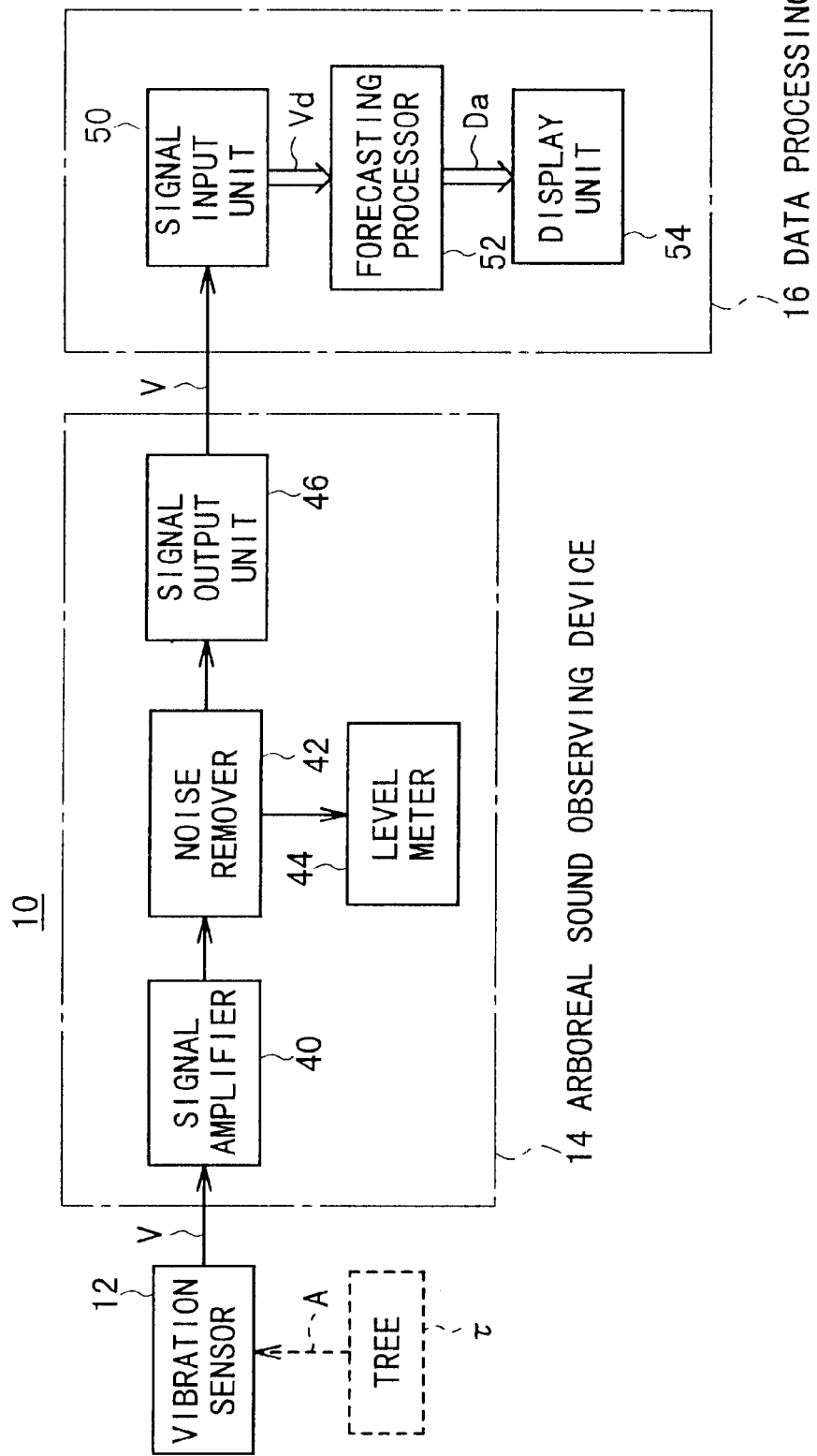
FIG. 1 is a block diagram of a weather forecasting apparatus according to the present invention.

Like or corresponding parts are denoted by like or corresponding reference characters throughout views.

A weather forecasting apparatus according to the present invention will first be described below.

FIG. 1 shows in block form a weather forecasting apparatus 10 according to the present invention.

As shown in FIG. 1, the weather forecasting apparatus 10 serves as an apparatus for forecasting information of atmospheric phenomena such as atmospheric states and various atmospheric conditions including rain, wind, thunder, etc. The weather forecasting apparatus 10 comprises a vibration sensor 12 as an arboreal sound measuring means, an arboreal sound observing device 14, and a data processing device 16.

Figure 2:
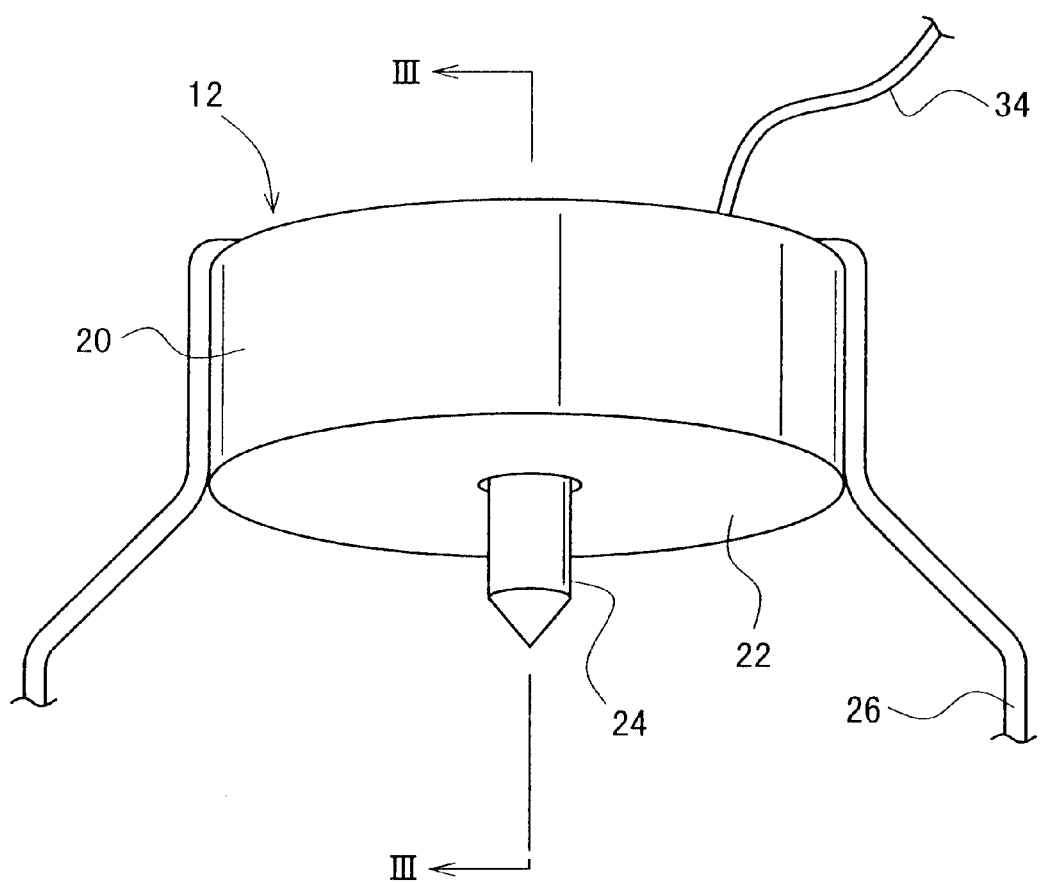
FIG. 2 is a perspective view of a vibration sensor of the weather forecasting apparatus shown in FIG. 1.
Figure 3:
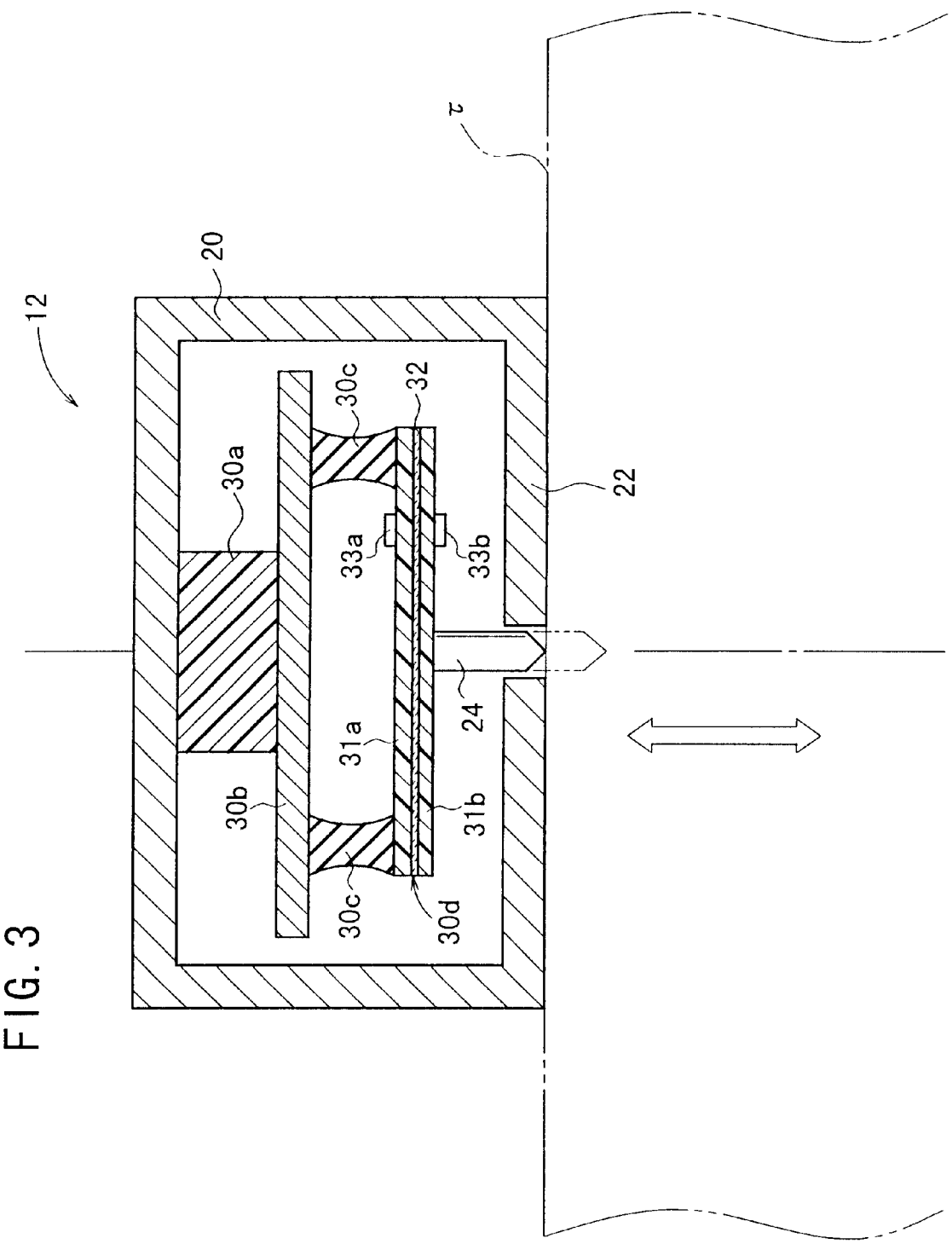
FIG. 3 is a cross-sectional view taken along line III—III of FIG. 2.

FIG. 2 shows the vibration sensor 12 in perspective, and FIG. 3 shows the vibration sensor 12 in cross section.

As shown in FIG. 2, the vibration sensor 12 comprises a substantially cylindrical flat casing 20 and a rod 24 projecting from a substantially central area of a mounting surface 22, i.e., a lower surface in FIG. 2, of the casing 20.

The vibration sensor 12 also has a belt 26 by which the vibration sensor 12 will be attached to a tree τ (see FIG. 4), as described later on.

As shown in FIG. 3, a cushion member 30a made of an urethane material or the like is disposed in the casing 20 and attached to an upper surface of the casing 20. A base plate 30b made of a metal material or the like is mounted on a lower surface of the cushion member 30a. The vibration sensor 12 has a vibration sensing element 30d mounted on the base plate 30b by a pair of columns 30c such as of rubber. The vibration sensing element 30d has its opposite ends supported by the columns 30c.

The vibration sensing element 30d comprises a pair of protective plates 31a, 31b made of a resin material or the like, and a piezoelectric element 32 sandwiched between the protective plates 31a, 31b. The piezoelectric element 32 is electrically connected to terminals 33a, 33b that are mounted respectively on the protective plates 31a, 31b.

The rod 24 is attached to a substantially central area of the vibration sensing element 30d. When the cushion member 30a is elastically deformed, the rod 24 moves back and forth along the axis of the casing 20. The rod 24 has a pointed or curved tip end.

When a force is applied via the rod 24 to the vibration sensing element 30d, the protective plates 31a, 31b are flexed. At this time, the piezoelectric element 32 is also flexed, producing a voltage V depending on its flexure, i.e., the applied force. The voltage V is supplied via a cable 34 (see FIG. 2) connected to the terminals 33a, 33b to a signal amplifier 40 (see FIG. 1).

The arboreal sound measuring means may comprise any of various other vibration sensors and various microphones including an inductive microphone, a variable-capacitance microphone, etc., rather than the vibration sensor 12 with the piezoelectric element 32.

Figure 4:
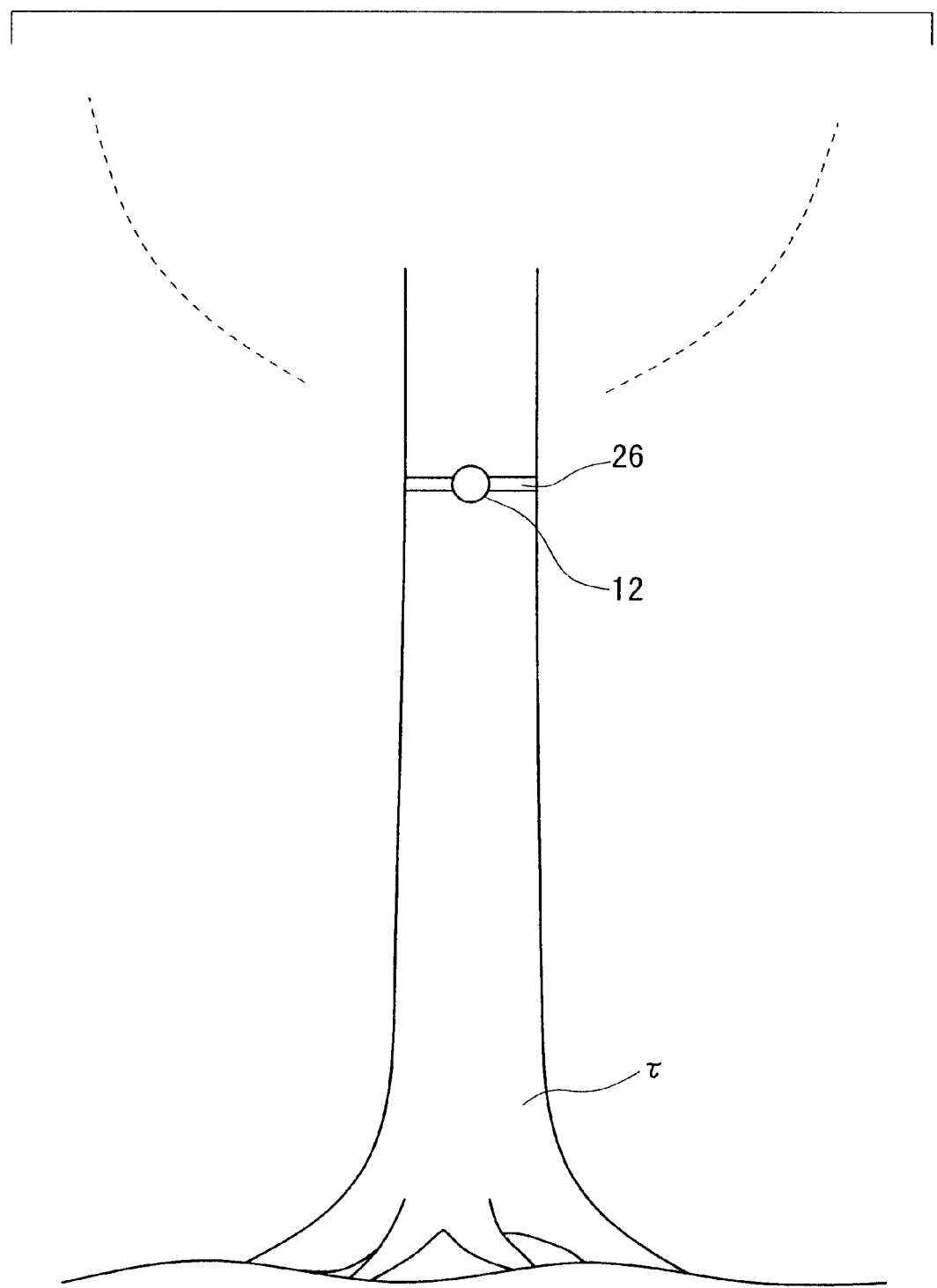
FIG. 4 is an elevational view showing the vibration sensor shown in FIGS. 2 and 3 as it is attached to a tree.

FIG. 4 shows the vibration sensor 12 as it is attached to the trunk of the tree τ. The vibration sensor 12 may instead be attached to a branch or branches of the tree τ. The vibration sensor 12 is mounted on the tree τ by the belt 26 with the mounting surface 22 (see FIG. 3) held in close contact with a surface of the tree τ. As shown in FIG. 3, the tip end of the rod 24 is retracted to the mounting surface 22, and held against the surface of the tree τ under repulsive forces (compressive forces) of the cushion member 30a.

The vibration sensor 12 should preferably be attached to the tree τ at a height or vertical position where the sound pressure of an arboreal sound A is relatively high.

The arboreal sound A that is produced by the tree τ, i.e., the sound propagated through the tree τ, including a sound transmitted from the underground through the roots of the tree τ (also referred to as "underground sound"), is detected by the vibration sensor 12. Specifically, when the arboreal sound A is transmitted via the rod 24 to the piezoelectric element 32, the piezoelectric element 32 outputs a voltage V depending on the arboreal sound A. The voltage V is supplied to the arboreal sound observing device 14.

As shown in FIG. 1, the arboreal sound observing device 14 comprises a signal amplifier 40, a noise remover 42, a level meter 44, and a signal output unit 46.

The signal amplifier 40 is supplied with the voltage V from the piezoelectric element 32, amplifies the voltage V to a level which is $10^4$ times the original level, for example, and outputs the amplified voltage V to the noise remover 42.

The noise remover 42 removes noise from the voltage V, and then supplies the voltage V to the signal output unit 46. The arboreal sound A resides mainly a frequency range up to 1 kHz. Therefore, the noise remover 42 comprises a low-pass filter (LPF) or a bandpass filter (BPF) (preferably a BPF) or the like for passing signals in such a frequency range.

The voltage V from which noise has been removed by the noise remover 42 is also supplied to the level meter 44. The level member 44 indicates a representation of the voltage V for the operator to confirm the magnitude of the arboreal sound A. Based on the indicated magnitude of the arboreal sound A, the operator may determine a height at which the vibration sensor 12 is attached to the tree τ, i.e., a height where the sound pressure of the arboreal sound A is relatively high.

The signal output unit 46 outputs the voltage V from the noise remover 42 to the data processing device 16.

The data processing device 16 comprises a signal input unit 50, a forecasting processor (weather forecasting means) 52, and a display unit 54. The data processing device 16 is actually in the form of a general-purpose computer such as a personal computer or the like, and the forecasting processor 52 is essentially in the form of a CPU (Central Processing Unit) including peripheral units.

The data processing device 16 also has a ROM (Read-Only Memory) for storing a system program and application programs, a RAM (Random Access Memory) used as a working memory, a timer for measuring time, and input/output interfaces such as an A/D converter, a D/A converter, etc.

The signal input unit 50 reads the voltage V from the signal output unit 46 of the arboreal sound observing device 14 at given time intervals, e.g., of one minute or ten minutes, etc. The signal input unit 50 converts the voltage V into a digital signal, and supplies the digital signal as representing a sound pressure level Vd corresponding to the sound pressure of the arboreal sound A to the forecasting processor 52. The signal input unit 50 may read the voltage V based on an instruction from the forecasting processor 52.

The forecasting processor 52 carries out a weather forecasting process based on the sound pressure level Vd from the signal input unit 50. Specifically, the forecasting processor 52 determines whether rain is going to start or not and whether rain is going to stop or not, based on a time-dependent change of the sound pressure level Vd.

Figure 5:
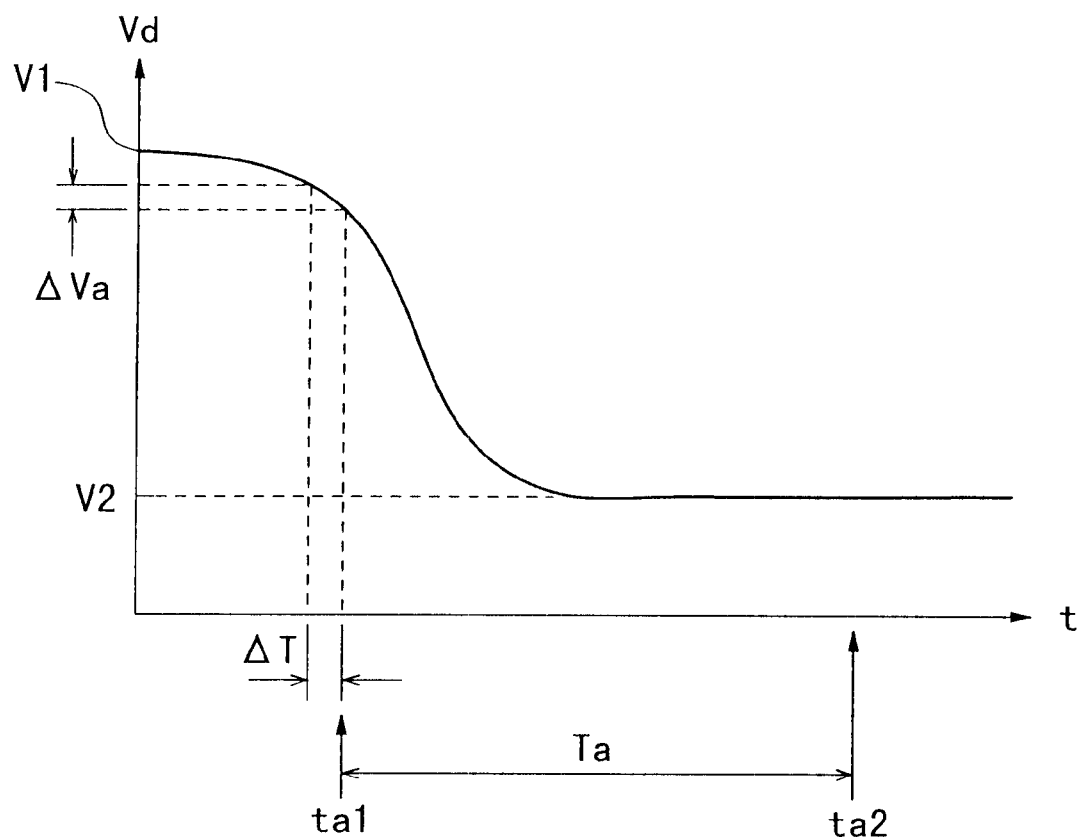
FIG. 5 is a diagram showing the relationship between the sound pressure level and the weather.
Figure 6:
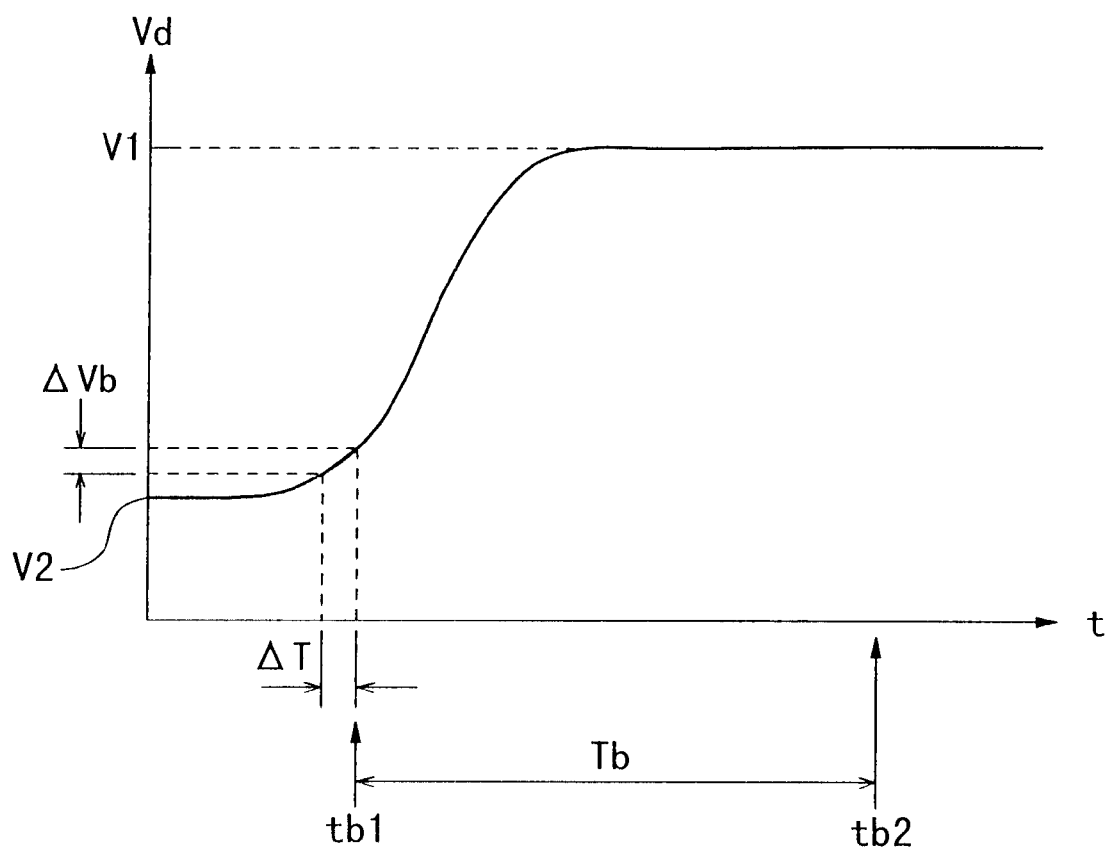
FIG. 6 is a diagram showing the relationship between the sound pressure level and the weather.

FIGS. 5 and 6 show the relationship between the sound pressure level Vd and the weather.

As shown in FIG. 5, the inventor of the present invention has experimentally confirmed that the sound pressure level Vd drops a few hours before rain starts to fall. Therefore, the beginning of a rainfall can be predicted by detecting a predetermined drop of the sound pressure level Vd.

The predetermined drop of the sound pressure level Vd is determined based on whether a rate of change $\Delta Va$, i.e., a time-differentiated value, in a given time period $\Delta T$, of the sound pressure level Vd as it falls from a value V1 in fine weather to a value V2 in rainy weather is greater than a predetermined value or not. Alternatively, the predetermined drop of the sound pressure level Vd may be determined based on whether the sound pressure level Vd has dropped below a predetermined threshold value or not.

A transition time Ta from a time ta1 (drop time) when the predetermined drop of the sound pressure level Vd is detected to a time ta2 (rainfall start time) when a rainfall starts can be determined essentially depending on each tree $\tau$, i.e., the environment (e.g., the height above the sea level) in which each tree $\tau$ is positioned. For example, the transition time Ta ranges from 5 to 6 hours for a tree $\tau$ positioned in a plain, and ranges from 2 to 3 hours for a tree $\tau$ positioned in a mountain area. If the transition time Ta changes with time, e.g., depending on the season, then the transition time Ta may be corrected chronologically.

As shown in FIG. 6, the inventor of the present invention has also experimentally confirmed that the sound pressure level Vd rises a few hours before rain stops falling. Therefore, the cease of a rainfall can be predicted by detecting a predetermined rise of the sound pressure level Vd. The predetermined rise of the sound pressure level Vd is determined based on whether a rate of change $\Delta Vb$, i.e., a time-differentiated value, in a given time period $\Delta T$, of the sound pressure level Vd as it rises from a value V2 in rainy weather to a value V1 in fine weather is greater than a predetermined value or not. Alternatively, the predetermined rise of the sound pressure level Vd may be determined based on whether the sound pressure level Vd has increased above a predetermined threshold value or not.

A transition time Tb from a time tb1 (rise time) when the predetermined rise of the sound pressure level Vd is detected to a time tb2 (rainfall end time) when a rainfall ends is essentially the same as the transition time Ta.

A weather forecasting process carried out by the forecasting processor 52 will be described below with reference to FIG. 7.

Figure 7:
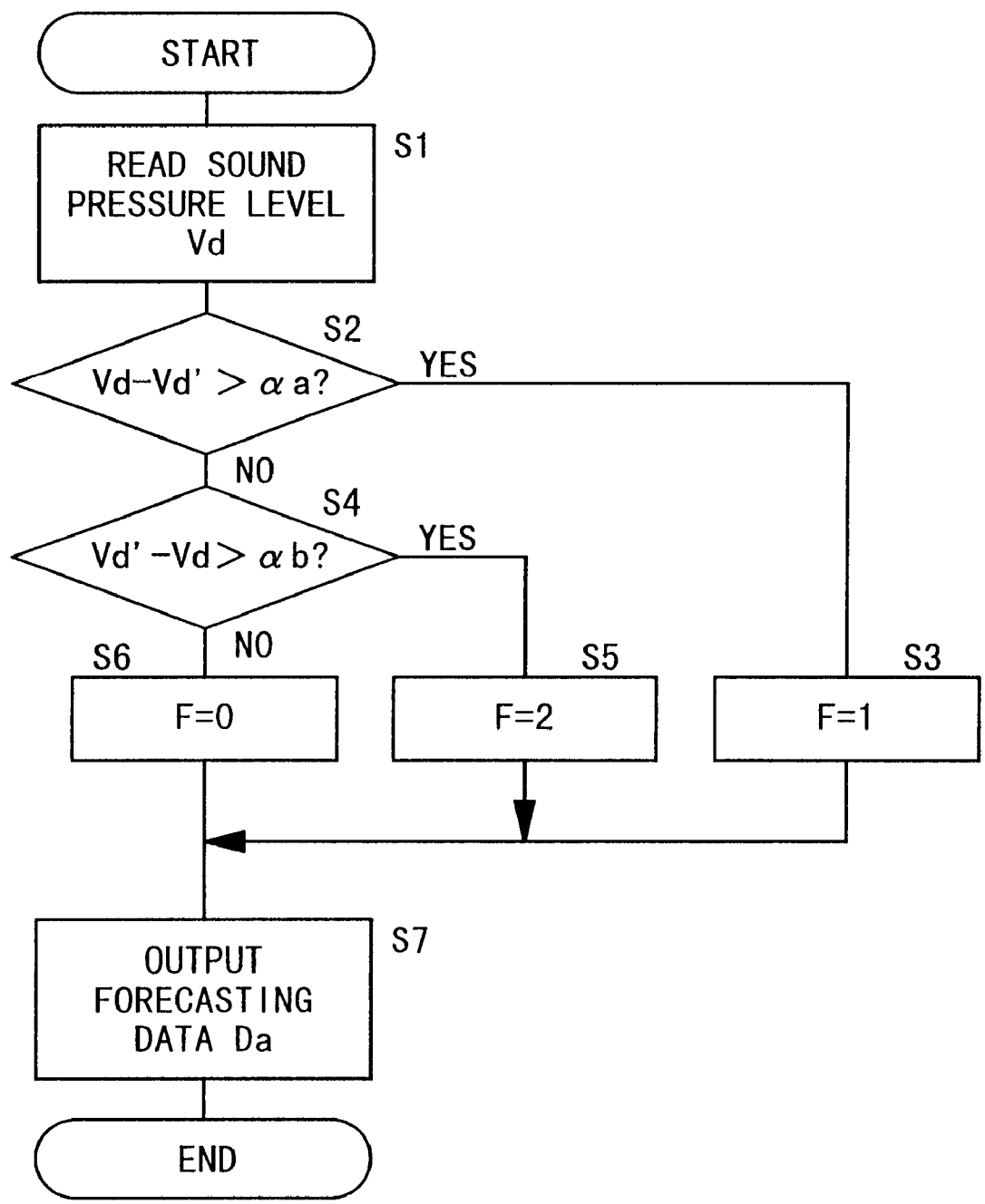
FIG. 7 is a flowchart of a weather forecasting process carried out by a forecasting processor of the weather forecasting apparatus shown in FIG. 1.

In step S1 shown in FIG. 7, the forecasting processor 52 reads a sound pressure level Vd outputted from the signal input unit 50.

In step S2, the forecasting processor 52 performs a process of determining whether a rainfall ends or not. Specifically, the forecasting processor 52 subtracts a sound pressure level Vd', which was read a given time Tf (e.g., ranging from several tens of minutes to several hours) prior to the sound pressure level Vd and stored in the RAM, from the sound pressure level Vd read in step S1, and determines whether the difference (time-depending change) is greater than a predetermined decision constant $\alpha a$ (Vd−Vd'>$\alpha a$) or not.

If Vd−Vd'>$\alpha a$ (YES: the rainfall ends), then control goes to step S3. If Vd−Vd'≦$\alpha a$ (NO: the rainfall continues), then control proceeds to step S4.

In step S3, the forecasting processor 52 sets a weather variable F to F=1 indicating that the rainfall ends after elapse of the transition time Tb, and stores a time t at which the weather variable F is set as the rise time tb1. After step S3, control goes to step S7.

In step S4, the forecasting processor 52 performs a process of determining whether a rainfall starts or not. Specifically, the forecasting processor 52 subtracts the sound pressure level Vd read in step S1 from the sound pressure level Vd', which was read the given time Tf prior to the sound pressure level Vd, and determines whether the difference (time-depending change) is greater than a predetermined decision constant $\alpha b$ (Vd'−Vd>$\alpha b$) or not.

If Vd'−Vd>$\alpha b$ (YES: the rainfall starts), then control goes to step S5. If Vd'−Vd≦$\alpha b$ (NO: the rainfall does not start), then control proceeds to step S6.

In step S5, the forecasting processor 52 sets the weather variable F to F=2 indicating that a rainfall starts after elapse of the transition time Ta, and stores a time t at which the weather variable F is set as the drop time ta1. After step S5, control goes to step S7.

In step S6, the forecasting processor 52 sets the weather variable F to F=0 indicating no weather changes. Thereafter, control goes to step S7.

In step S7, the forecasting processor 52 supplies weather information including the variable F, the rise time tb1, the drop time ta1, etc. as forecasting data Da to the display unit 54 shown in FIG. 1. Based on the supplied forecasting data Da, the display unit 54 displays on its display screen local weather information at a time after several hours from the present time in a region where the tree $\tau$ is positioned.

If the given time Tf in steps S2, S4 is several hours, for example, then it is possible to reduce the effect of noise and hence to avoid an error. If, however, the sound pressure of the arboreal sound A changes from hour to hour, then the accuracy of the weather information may tend to fall.

If the given time Tf in steps S2, S4 is several tens of minutes, for example, then it is possible to determine the start or end of a rainfall, i.e., a time at which the sound pressure level Vd starts changing, at an earlier time. If, however, the sound pressure of the arboreal sound A changes slowly, then the accuracy of the weather information may tend to fall.

In view of the above tendencies, the given time Tf may be set to either several hours or several tens of minutes, or may be changed alternately to several hours and several tens of minutes for producing weather information with increased accuracy.

As described above, the weather forecasting apparatus 10 according to the present invention can produce local weather information highly accurately which has heretofore been difficult to obtain.

The weather forecasting apparatus 10 is of a relatively simple structure as it is made up of the vibration sensor 12, the arboreal sound observing device 14, and the data processing device 16.

Because the vibration sensor 12 is attached to the tree τ by the belt 26, the weather forecasting apparatus 10 can easily be installed in place.

The vibration sensor 12 can produce other weather information than the above information that is indicative of the weather after several hours from the present time.

For example, it has experimentally been confirmed by the inventor that in Niigata prefecture and other adjacent prefectures in Japan, a change in the sound pressure level Vd from late August to late September is closely related to the time of the first snowfall of the season, and a change in the sound pressure level Vd from middle September to middle October is closely related to the time of the start of the continuous snow cover. Therefore, the time of the first snowfall of the season or the time of the start of the continuous snow cover can be predicted from such a change in the sound pressure level Vd.

It has also experimentally been confirmed by the inventor that the sound pressure level Vd abruptly changes immediately before an occurrence of thunder. Therefore, an occurrence of thunder can be predicted from such a change in the sound pressure level Vd.

A weather forecasting system according to the present invention will be described below.

Figure 8:
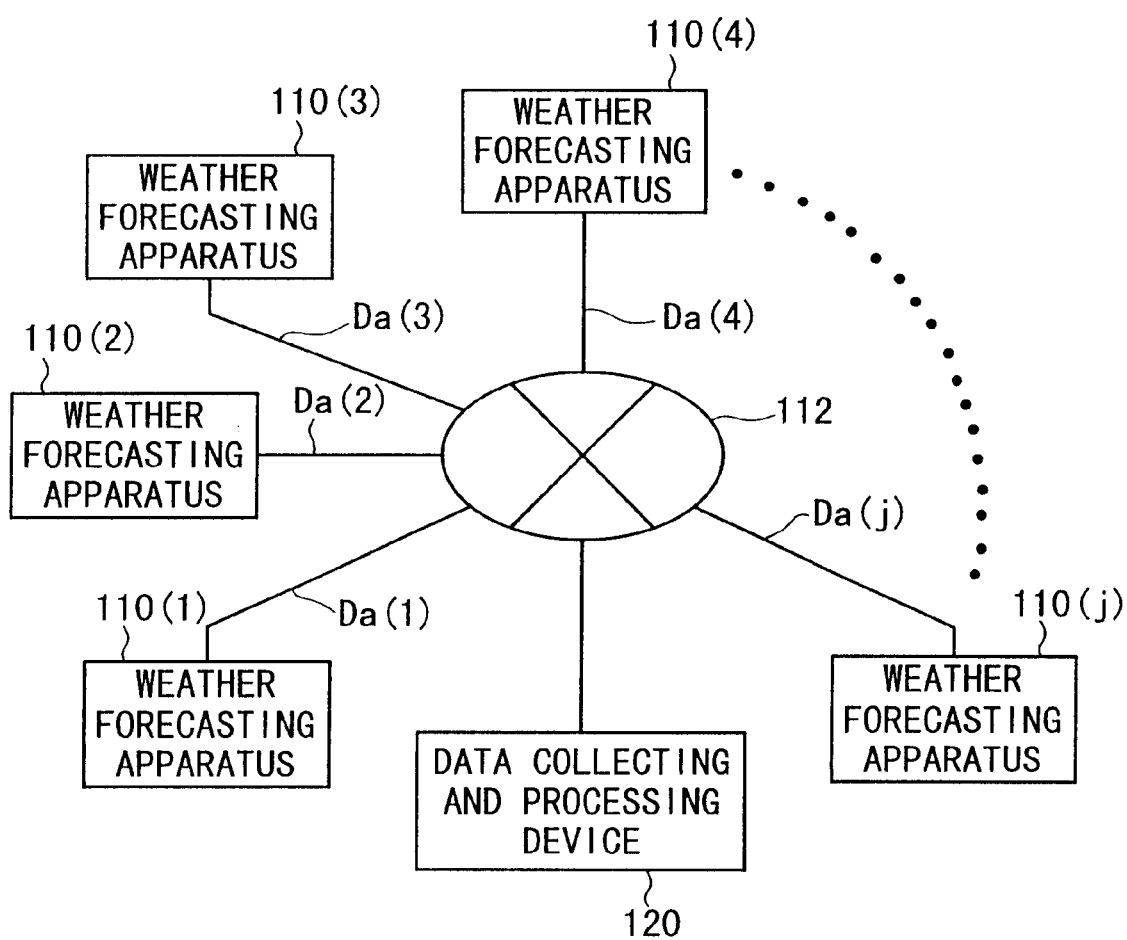
FIG. 8 is a block diagram of a weather forecasting system according to the present invention.

FIG. 8 shows in block form a weather forecasting system 100 according to the present invention. As shown in FIG. 8, the weather forecasting system 100 comprises a plurality of weather forecasting apparatus 110(n) (n=1, 2, ..., j) and a data collecting and processing device 120 connected to the weather forecasting apparatus 110(n) via a wired or wireless network 112.

Figure 9:
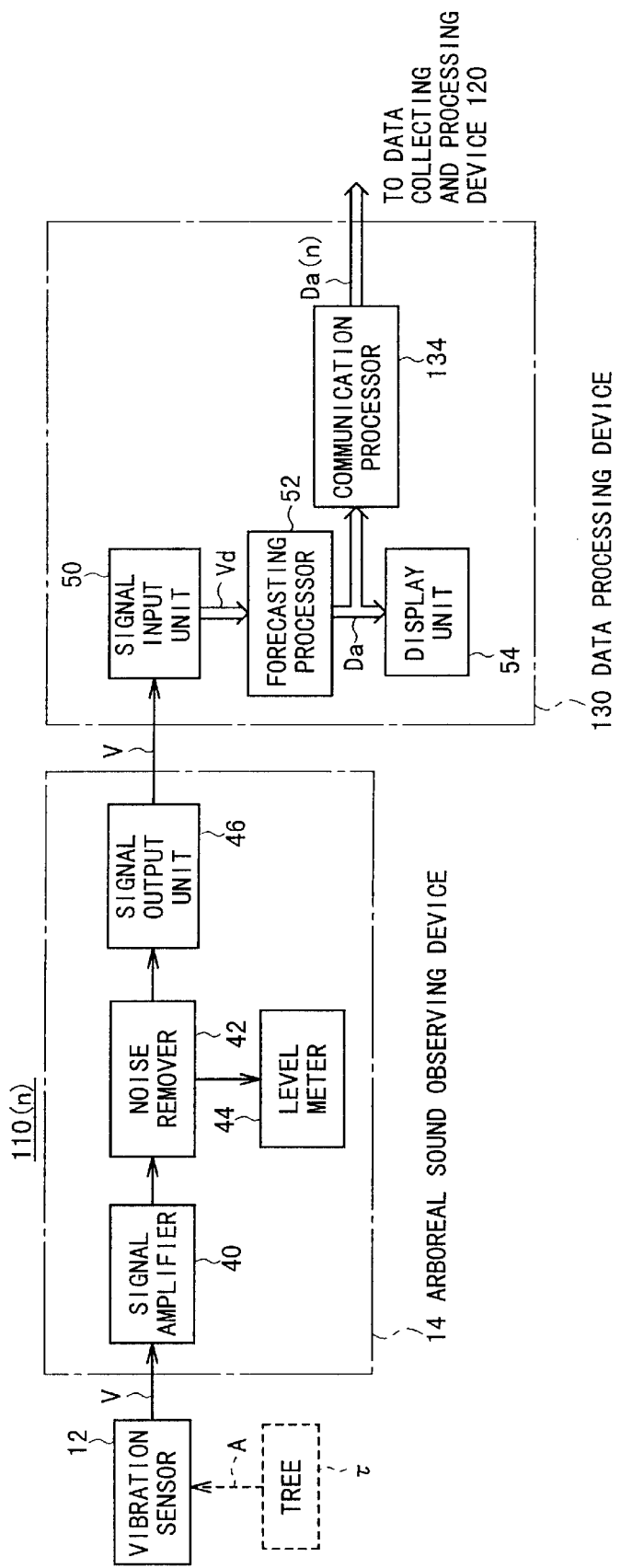
FIG. 9 is a block diagram of a weather forecasting apparatus of the weather forecasting system shown in FIG. 8.

FIG. 9 shows in block form each of the weather forecasting apparatus 110(n). As shown in FIG. 9, each of the weather forecasting apparatus 110(n) comprises a vibration sensor 12, an arboreal sound observing device 14, and a data processing device 130. The vibration sensor 12 and the arboreal sound observing device 14 are identical to those of the weather forecasting apparatus 10 shown in FIG. 1. Those parts of the vibration sensor 12 and the arboreal sound observing device 14 which are identical to those of the weather forecasting apparatus 10 shown in FIG. 1 are denoted by identical reference characters, and will not be described in detail below.

As shown in FIG. 9, the data processing device 130 comprises a signal input unit 50, a forecasting processor 52, a display unit 54, and a communication processor 134. The signal input unit 50, the forecasting processor 52, and the display unit 54 are identical to those of the data processing device 16 of the weather forecasting apparatus 10 shown in FIG. 1. Those parts of the signal input unit 50, the forecasting processor 52, and the display unit 54 which are identical to those of the weather forecasting apparatus 10 shown in FIG. 1 are denoted by identical reference characters, and will not be described in detail below.

Forecasting data Da including the variable F, the rise time tb1, the drop time ta1, etc., outputted from the forecasting processor 52, are supplied to the display unit 54 and the communication processor 134. The communication processor 134 transmits the forecasting data Da as forecasting data Da(n) (n=1, 2, ..., j) via the network 112 to the data collecting and processing device 120 (see FIG. 8). To the forecasting data Da(n), there are added pieces of information for identifying the respective weather forecasting apparatus 110(n).

Figure 10:
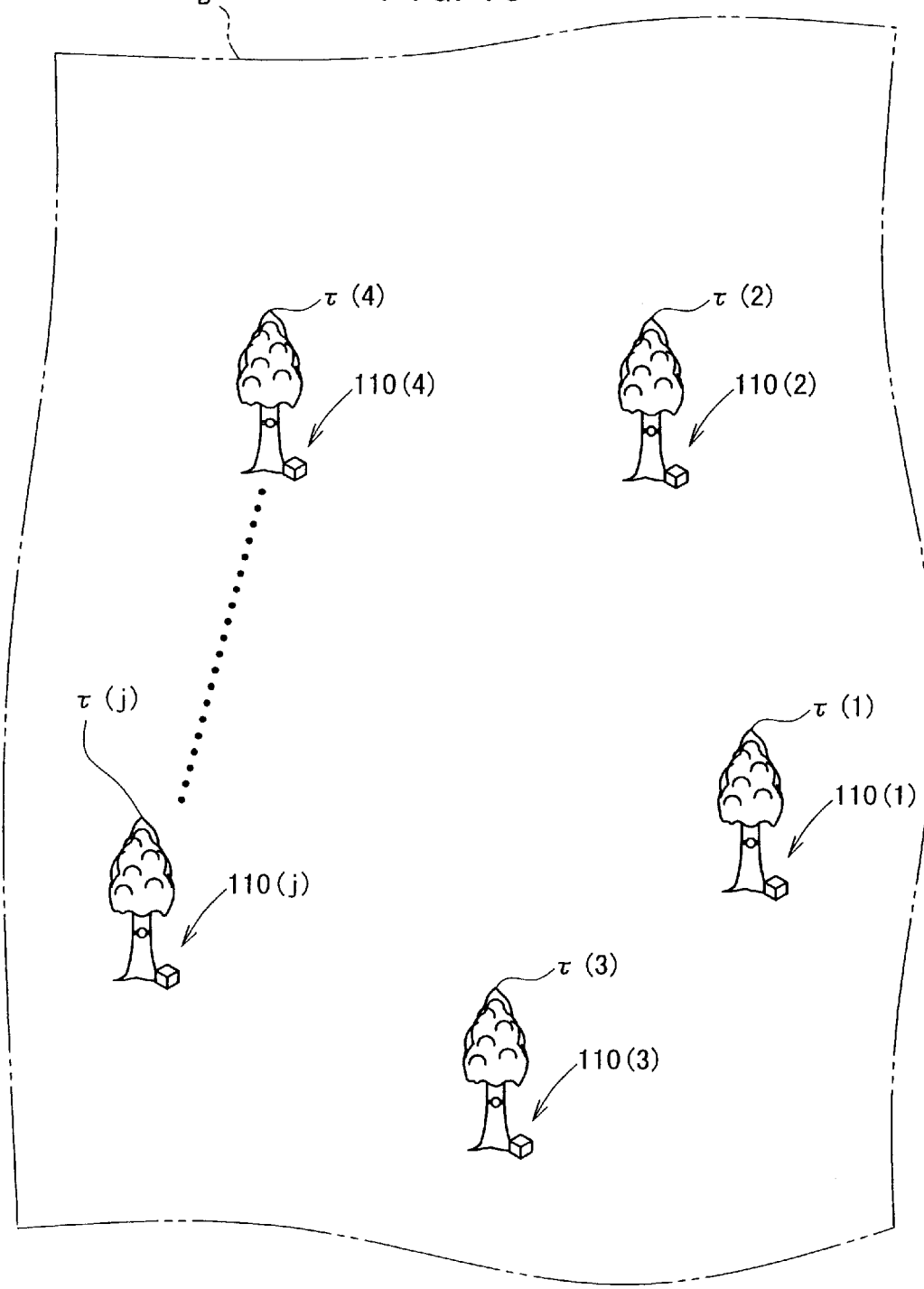
FIG. 10 is a view schematically showing locations where the weather forecasting apparatus shown in FIG. 9 is installed in a given region whose weather is to be forecast.

FIG. 10 schematically shows locations where the weather forecasting apparatus 110(n) are installed in a given region B where atmospheric phenomena will be predicted.

The vibration sensors 12 are attached to respective trees τ(n) (n=1, 2, ..., j) in the region B. Each of the weather forecasting apparatus 110(n) measures the arboreal sound A of the corresponding tree τ(n) to predict local atmospheric phenomena in the position of the tree τ(n) according to a process which is the same as the process shown in FIG. 7.

As shown in FIG. 8, the forecasting data Da obtained by the respective weather forecasting apparatus 110(n) are transmitted to the data collecting and processing device 120. Based on the supplied forecasting data Da(n), the data collecting and processing device 120 determines a distribution of local predicted atmospheric phenomena and supplies the determined distribution to a display unit (not shown).

Figure 11:
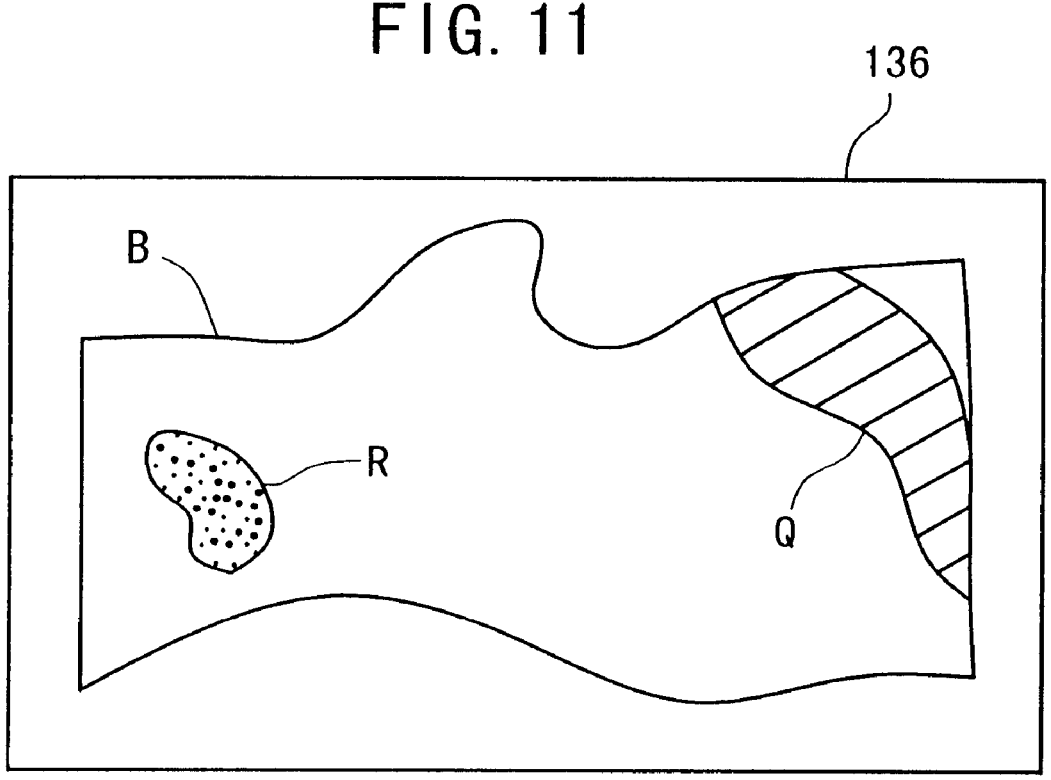
FIG. 11 is a view showing the display screen of a display unit of a data collecting and processing device of the weather forecasting system shown in FIG. 8.

FIG. 11 shows the display screen 136 of the display unit of the data collecting and processing device 120. The display screen 136 displays an image representing the region B, e.g., a white image against a black background, the image including a distribution of forecast atmospheric phenomena in different colors. For example, the region B includes a hatched area Q, displayed in red, for example, which is expected to have a rainfall put to an end, and a stippled area R, displayed in blue, for example, which is expected to have a rainfall starting.

As described above, the weather forecasting system 100 is capable of obtaining a distribution of forecast atmospheric phenomena within the region B where the weather forecasting apparatus 110(n) are installed, and hence of accurately forecasting the weather in a wide geographical region.

Based on the distribution of forecast atmospheric phenomena obtained by the weather forecasting system 100, it is possible to correct a distribution of forecast atmospheric phenomena which has been obtained by a conventional process.

When a distribution of forecast atmospheric phenomena is to be determined through numerical calculations, the accuracy of such numerical calculations can be increased by using the distribution of forecast atmospheric phenomena obtained by the weather forecasting system 100 as initial values, corrective values, boundary values, etc.

The weather forecasting system 100 is also capable of predicting the course of a hurricane (including a typhoon, a cyclone, or the like), a low pressure, or the like. Specifically, it has experimentally been confirmed by the inventor that the sound pressure level Vd drops several hours before a hurricane or a low pressure reaches the position of the trees τ(n) and when the distance between the center of the hurricane or the low pressure and the position of the trees τ(n) is about 800 km. Therefore, based on the change of the sound pressure level Vd at the trees τ(n), it is possible to predict the course of the hurricane or the low pressure more than several hours before the hurricane or the low pressure reaches the position of the trees τ(n) or when the distance between the center of the hurricane or the low pressure and the position of the trees τ(n) is about 800 km.

A snowfall forecasting apparatus according to the present invention will be described below.

Figure 12:
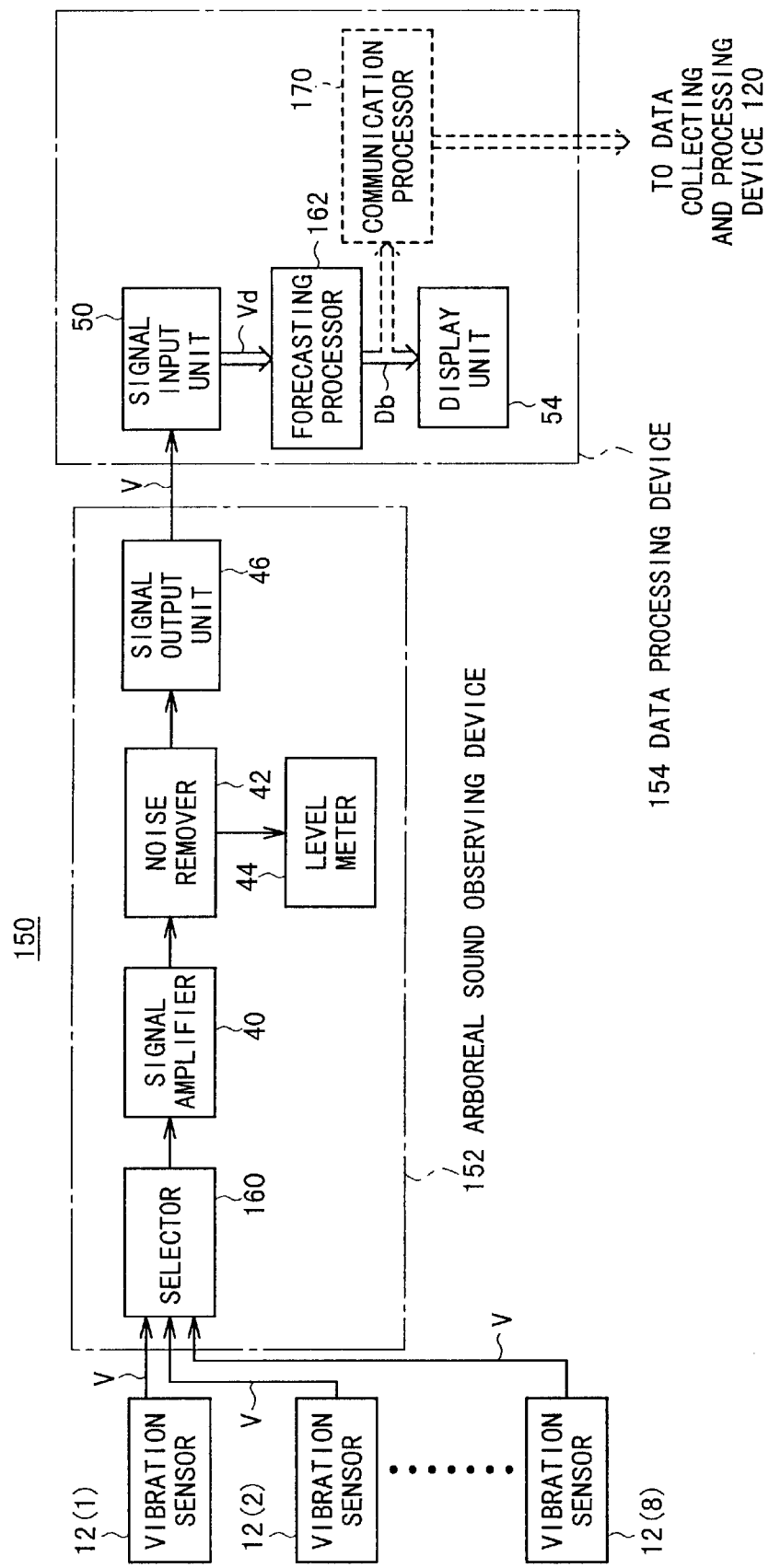
FIG. 12 is a block diagram of a snowfall forecasting apparatus according to the present invention.

FIG. 12 shows in block form a snowfall forecasting apparatus 150 according to the present invention.

As shown in FIG. 12, the snowfall forecasting apparatus 150 comprises a plurality of (e.g., eight) vibration sensors 12(m) (m=1, 2, . . . , 8), an arboreal sound observing device 152, and a data processing device 154.

Figure 13:
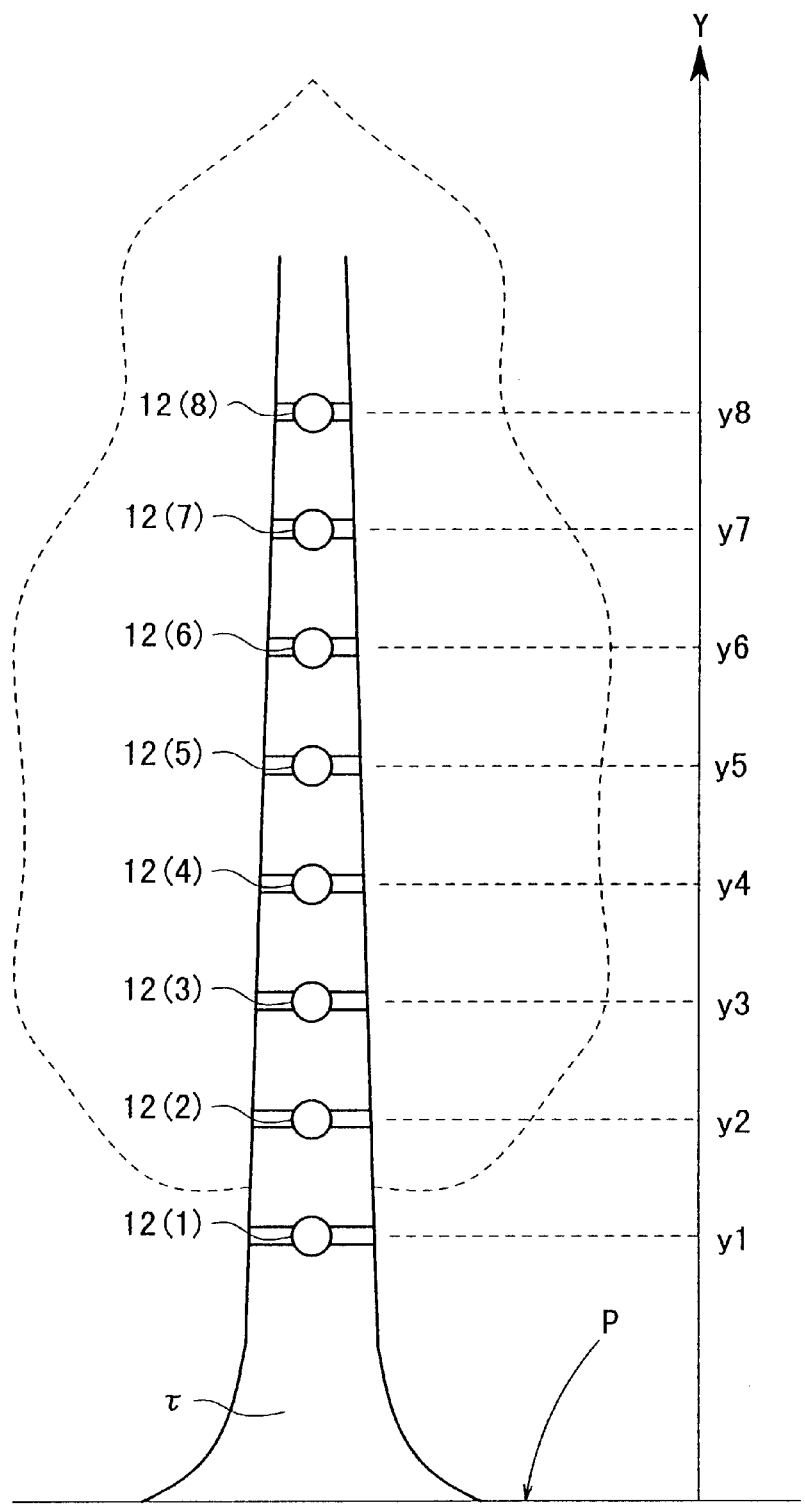
FIG. 13 is a view showing vibration sensors of the snowfall forecasting apparatus shown in FIG. 12 which are attached to a tree.

FIG. 13 shows the vibration sensors 12(m) attached to the trunk of a tree τ. The vibration sensors 12(m) may be attached to a branch or branches of a tree τ. Each of the vibration sensors 12(m) is of a structure identical to that of the vibration sensor 12 of the weather forecasting apparatus 10 shown in FIG. 1.

The vibration sensors 12(m) attached to the trunk of the tree τ at spaced intervals, each of which may range from several cm to several tens of cm, and is 70 cm in FIG. 13. The vibration sensors 12(m) are spaced from the ground level p by respective heights y1, y2, . . . , y8. The number of vibration sensors 12(m) attached to the tree τ may be determined depending on the height of the tree τ and desired intervals at which the vibration sensors 12(m) are spaced.

As shown in FIG. 12, the vibration sensors 12(m) are connected to the arboreal sound observing device 152, and outputs respective voltages V representing arboreal sounds A to the arboreal sound observing device 152.

The arboreal sound observing device 152 comprises a selector 160, a signal amplifier 40, a noise remover 42, a level meter 44, and a signal output unit 46. The signal amplifier 40, the noise remover 42, the level meter 44, and the signal output unit 46 are identical to those of the arboreal sound observing device 14 of the weather forecasting apparatus 10 shown in FIG. 1, and will not be described in detail below.

The selector 160 successively selects the vibration sensors 12(m) at predetermined time intervals in a predetermined order, and successively sends the voltages V from the selected vibration sensors 12(m) to the signal amplifier 40. The selector 160 may successively select the vibration sensors 12(m) based on an instruction from the data processing device 154.

The voltages V from the vibration sensors 12(m) are successively amplified by the signal amplifier 40, and noise is removed from the amplified voltages V by the noise remover 42. Thereafter, the voltages V are supplied to the signal output unit 46, which outputs the voltages V to the data processing device 154.

The data processing device 154 comprises a signal input unit 50, a forecasting processor (snowfall forecasting means) 162, and a display unit 54. The signal input unit 50 and the display unit 54 are identical to those of the data processing device 16 of the weather forecasting apparatus 10 shown in FIG. 1. The forecasting processor 162 has a hardware arrangement which is substantially the same as the hardware arrangement of the forecasting processor 52 of the data processing device 16 of the weather forecasting apparatus 10 shown in FIG. 1.

The voltage V from the signal output unit 46 is sampled and converted into a digital signal by the signal input unit 50. The sampled digital voltage V is supplied from the signal input unit 50 as a sound pressure level Vd corresponding to the sound pressure of the arboreal sound A to the forecasting processor 162. The forecasting processor 162 is also supplied with information for identifying one of the vibration sensors 12(m) which corresponds to, i.e., has acquired, the sound pressure level Vd. In this manner, the sound pressure levels Vd from all the vibration sensors 12(m) are supplied to the forecasting processor 162.

Based on the sound pressure levels Vd from the vibration sensors 12(m), the forecasting processor 162 detects changes in the sound pressure level Vd in the direction of the height Y of the tree τ. Then, the forecasting processor 162 determines a predicted snowfall L (see FIG. 14) in the year based on the detected changes in the sound pressure level Vd.

Figure 14:
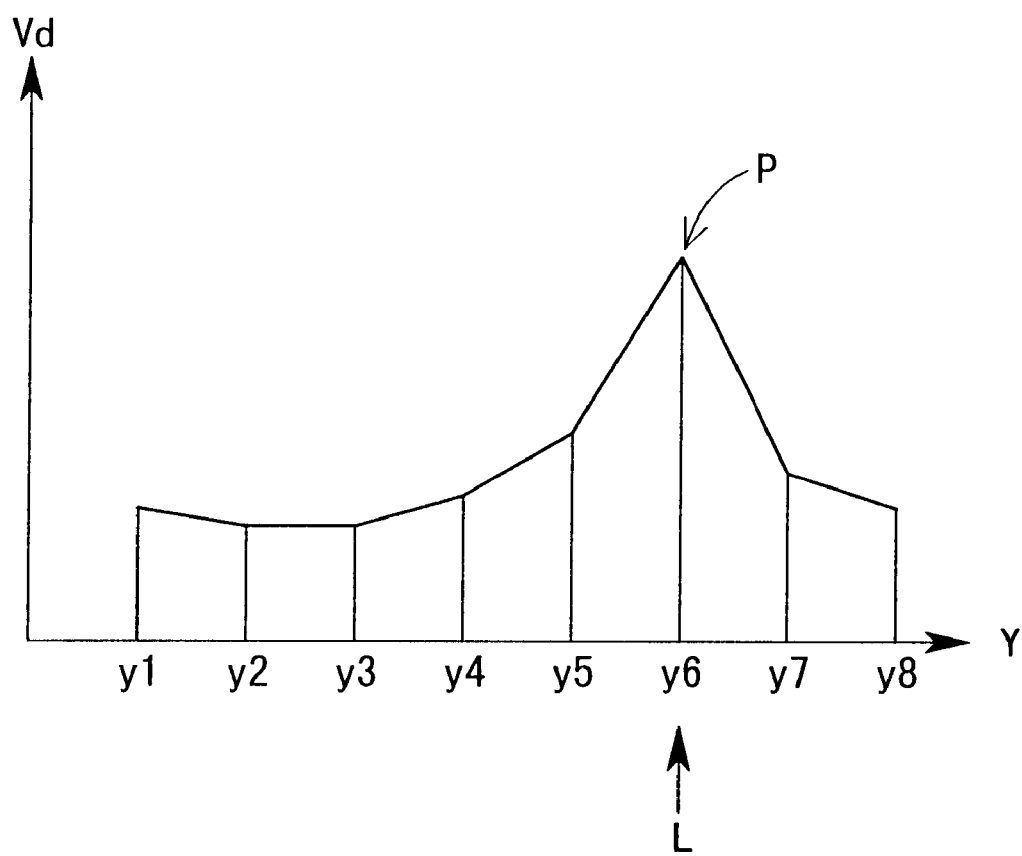
FIG. 14 is a diagram showing different sound pressure levels at various heights along the tree.

FIG. 14 shows an example of the characteristics of sound pressure levels Vd as to the height Y, i.e., different sound pressure levels Vd at respective heights along the tree τ. As shown in FIG. 14, the sound pressure levels Vd include a positive peak P at a certain height, i.e., the height y6 in FIG. 14. It has experimentally been confirmed by the inventor that the height y6 corresponding to the peak P agrees with the greatest snowfall in the year. Therefore, it is possible to obtain a predicted snowfall, i.e., a predicted maximum snowfall, L in the year by detecting the peak P of the sound pressure levels Vd and determining a height corresponding to the peak P.

However, if the tree τ is of a height that is twice the predicted maximum snowfall L or more, then the sound pressure levels Vd may include a plurality of peaks P. In that case, the smallest (lowest) of the heights corresponding to the respective peaks P may be employed as the predicted maximum snowfall L.

In order to obtain an accurate predicted maximum snowfall L, it is preferable to observe arboreal sounds three months to six months prior to the start of a snowfall.

Figure 15:
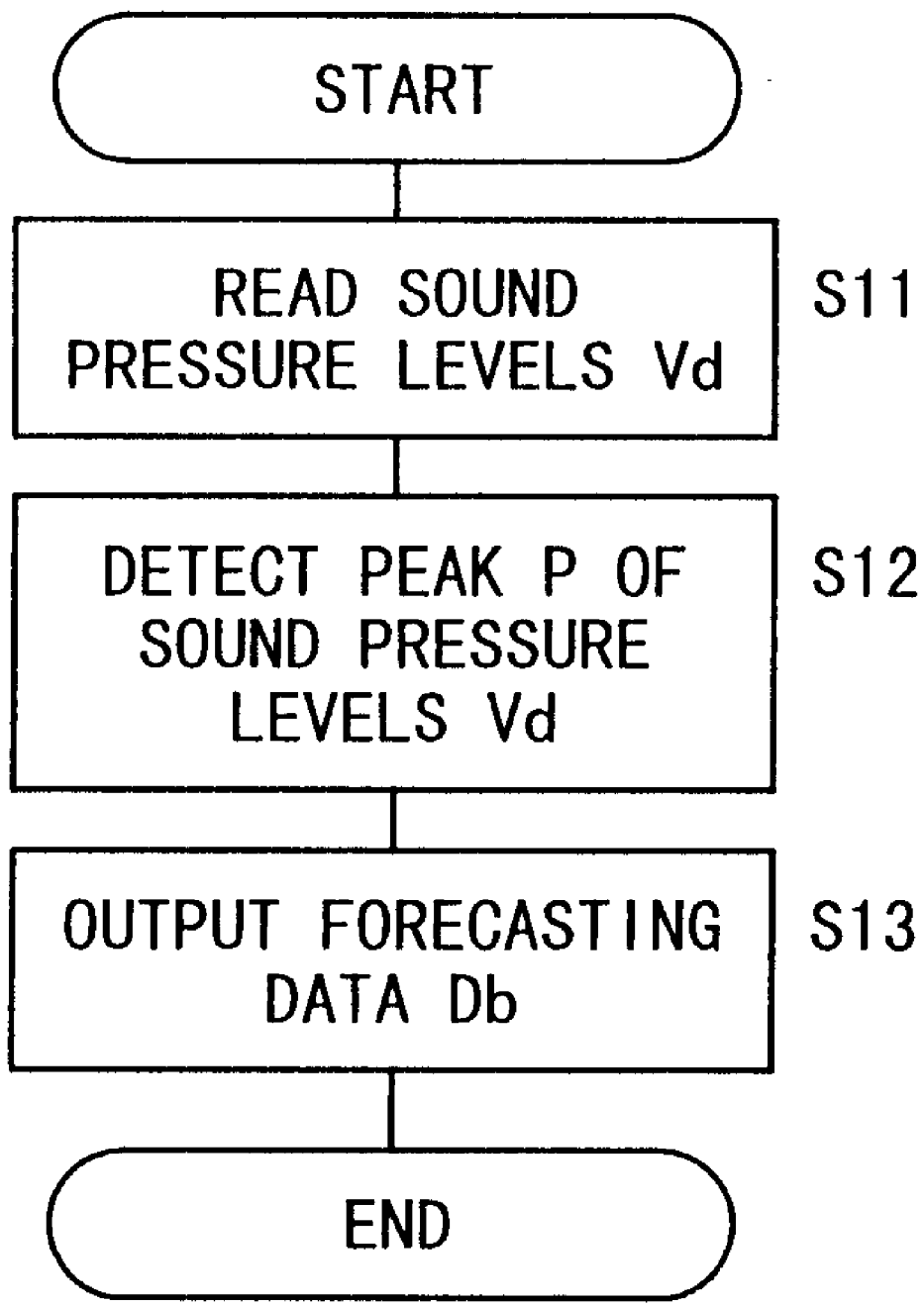
FIG. 15 is a flowchart of a process of determining a predicted maximum snowfall which is carried out by a forecasting processor of the snowfall forecasting apparatus shown in FIG. 12.

FIG. 15 shows a process of determining a predicted maximum snowfall L which is carried out by the forecasting processor 162.

In step S11 shown in FIG. 15, the forecasting processor 162 reads sound pressure levels Vd from the signal input unit 50. At this time, the forecasting processor 162 is also supplied with information for identifying the vibration sensors 12(m) which correspond to, i.e., has acquired, the sound pressure levels Vd. The forecasting processor 162 stores the spaced intervals at which the vibration sensors 12(m) are installed, as known values.

In step S12, the forecasting processor 162 detects a peak P of the sound pressure levels Vd, and determines a height corresponding to the peak P. The forecasting processor 162 establishes the determined height as a predicted maximum snowfall L.

In step S13, the forecasting processor 162 outputs forecasting data Db including the predicted maximum snowfall L obtained in step S12 to the display unit 54 (see FIG. 12). Based on the supplied forecasting data Db, the display unit 54 displays on its display screen local weather information at the area where the tree τ is positioned and the predicted maximum snowfall L in the year.

As with the weather forecasting system 100 shown in FIG. 8, a plurality of snowfall forecasting apparatus 150 shown in FIG. 12 may be used to construct a snowfall forecasting system for determining a distribution of predicted maximum snowfalls L in a certain geographical region. In such a snowfall forecasting system, the data processing device 154 of each of the snowfall forecasting apparatus 150 has a communication processor 170 (see FIG. 12) for transmitting the forecasting data Db from the forecasting processor 162 via the network 112 to the data collecting and processing device 120.

Figure 16:
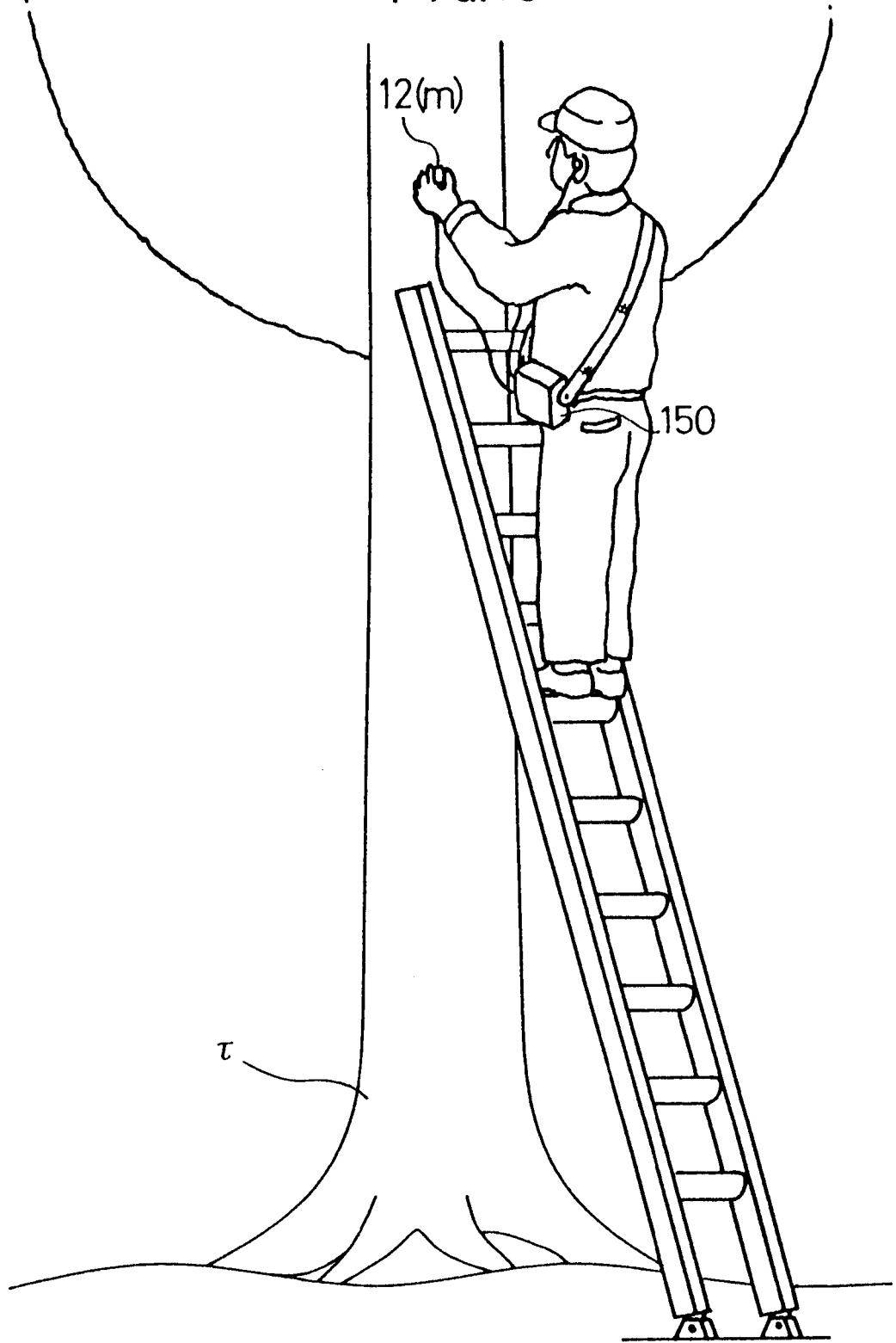
FIG. 16 is a view showing the manner in which arboreal sounds are manually measured using the snowfall forecasting apparatus shown in FIG. 12.

As shown in FIG. 16, the operator may measure sound pressure levels Vd at different spaced intervals along the height of the tree τ with a vibration sensor 12(m) manually held against the tree τ by moving the vibration sensor 12(m) successively over the spaced intervals, and then determine a peak or predicted maximum snowfall L from the measured sound pressure levels Vd.

According to the process shown in FIG. 16, since the snowfall forecasting apparatus 150 is required to have a single vibration sensor 12, the snowfall forecasting apparatus 150 does not need to have the selector 160. If the operator determines a peak while confirming the sound pressure level Vd, or actually the magnitude of the voltage V, with the level meter 44, then since the snowfall forecasting apparatus 150 is not required to have the data processing device 154, the snowfall forecasting apparatus 150 may be of a size small enough to be carried by the operator as shown in FIG. 16. The operator may measure the sound pressure level Vd while confirming the arboreal sound A with their ear.

As described above, the snowfall forecasting apparatus 150 is capable of accurately obtaining a local predicted maximum snowfall L in the year which has heretofore been difficult to obtain.

The snowfall forecasting apparatus 150 is of a relatively simple structure as it is made up of the vibration sensors 12(m), the arboreal sound observing device 152, and the data processing device 154.

The snowfall forecasting apparatus 150 can also forecast a rainfall in the summer. Specifically, it has experimentally been confirmed by the inventor that the height along the tree at the peak P of sound pressure levels Vd during a period from February to May is closely related to a rainfall in the summer in the year. Therefore, a rainfall in the summer can be predicted from the height along the tree at the peak P of sound pressure levels Vd.

According to the present invention, consequently, it is possible to accurately forecast local atmospheric phenomena and a local snowfall.

Although certain preferred embodiments of the present invention have been shown and described in detail, it should be understood that various changes and modifications may be made therein without departing from the scope of the appended claims.

What is claimed is:

1. An apparatus for forecasting the weather, comprising:
   arboreal sound measuring means for measuring a sound propagated through a tree; and
   weather forecasting means for forecasting atmospheric phenomena based on a change in the sound measured by said arboreal sound measuring means.

2. An apparatus according to claim 1, wherein said change in the sound comprises a time-dependent change in a sound pressure of the sound.

3. An apparatus according to claim 2, wherein said weather forecasting means comprises:
   means for predicting the start of a rainfall if a drop of said sound pressure is confirmed, and predicting the end of a rainfall if a rise of said sound pressure is confirmed.

4. A method of predicting the weather, comprising the steps of:
   measuring a sound propagated through a tree; and
   forecasting atmospheric phenomena based on a change in the measured sound.

5. A method according to claim 4, wherein said change in the sound comprises a time-dependent change in a sound pressure of the sound.

6. A method according to claim 5, wherein said step of forecasting atmospheric phenomena comprises the steps of:
   predicting the start of a rainfall if a drop of said sound pressure is confirmed; and
   predicting the end of a rainfall if a rise of said sound pressure is confirmed.

7. An apparatus for forecasting a snowfall, comprising:
   arboreal sound measuring means for measuring a sound propagated through a tree along the height of the tree; and
   snowfall forecasting means for forecasting a snowfall based on a change along the height of the tree in the sound measured by said arboreal sound measuring means.

8. An apparatus according to claim 7, wherein said change along the height of the tree in the sound comprises a change in a sound pressure of the sound along the height of the tree.

9. An apparatus according to claim 8, wherein said snowfall forecasting means comprises:
   means for forecasting a position where a positive peak of said sound pressure along the height of said tree occurs as a predicted maximum snowfall.

10. A method of forecasting a snowfall, comprising the steps of:
    measuring a sound propagated through a tree along the height of the tree; and
    forecasting a snowfall based on a change along the height of the tree in the measured sound.

11. A method according to claim 10, wherein said change along the height of the tree in the sound comprises a change in a sound pressure of the sound along the height of the tree, and said step of forecasting a snowfall comprises the step of:
    forecasting a position where a positive peak of said sound pressure along the height of said tree occurs as a predicted maximum snowfall.

12. A weather forecasting system comprising:
    arboreal sound measuring means for measuring a sound propagated through a tree;
    a plurality of weather forecasting apparatus for forecasting atmospheric phenomena based on a change in the sound measured by said arboreal sound measuring means; and
    a data collecting and processing device connected to said weather forecasting apparatus by a network, for forecasting atmospheric phenomena in a wide geographical region.

13. A weather forecasting system according to claim 12, wherein said change in the sound comprises a time-dependent change in a sound pressure of the sound, and said data collecting and processing device comprises:
    means for forecasting the course of a hurricane or a low pressure based on the time-dependent change in the sound pressure in a position where said weather forecasting apparatus are installed.

* * * * *